United States Patent
Modeé et al.

(10) Patent No.: US 12,296,563 B2
(45) Date of Patent: May 13, 2025

(54) MULTILAYER STRETCH FILM

(71) Applicant: TRIOWORLD SMÅLANDSSTENAR AB, Gislaved (SE)

(72) Inventors: Mattias Modeé, Värnamo (SE); Torbjörn Runesson, Smålandsstenar (SE); Robert Johansson, Smålandsstenar (SE)

(73) Assignee: TRIOWORLD SMÅLANDSSTENAR AB, Gislaved (SE)

( * ) Notice: Subject to any disclaimer, the term of this patent is extended or adjusted under 35 U.S.C. 154(b) by 214 days.

(21) Appl. No.: 17/755,698

(22) PCT Filed: Nov. 6, 2020

(86) PCT No.: PCT/EP2020/081328
§ 371 (c)(1),
(2) Date: May 5, 2022

(87) PCT Pub. No.: WO2021/089806
PCT Pub. Date: May 14, 2021

(65) Prior Publication Data
US 2022/0388285 A1    Dec. 8, 2022

(30) Foreign Application Priority Data
Nov. 8, 2019   (EP) ..................... 19208074

(51) Int. Cl.
*B32B 27/08*    (2006.01)
*B32B 27/32*    (2006.01)
(Continued)

(52) U.S. Cl.
CPC ............. *B32B 27/08* (2013.01); *B32B 27/32* (2013.01); *B29C 48/08* (2019.02); *B29C 48/21* (2019.02);
(Continued)

(58) Field of Classification Search
CPC .................. B32B 27/08; B32B 27/32; B32B 2250/242; B32B 2250/40; B32B 2272/00; B32B 2307/54
See application file for complete search history.

(56) References Cited

U.S. PATENT DOCUMENTS

| | | |
|---|---|---|
| 4,923,750 A | 5/1990 | Jones |
| 5,300,353 A | 4/1994 | Yoshimura et al. |
| 2015/0258755 A1* | 9/2015 | Kauschke ............... B32B 27/08 264/510 |

FOREIGN PATENT DOCUMENTS

| | | |
|---|---|---|
| EP | 0 124 310 A2 | 11/1984 |
| EP | 0 528 980 A1 | 3/1993 |

(Continued)

OTHER PUBLICATIONS

International Search Report and Written Opinion, mailed Jan. 26, 2021, issued in corresponding International Application No. PCT/EP2020/081328, filed Nov. 6, 2020, 12 pages.

(Continued)

*Primary Examiner* — Joanna Pleszczynska
(74) *Attorney, Agent, or Firm* — Christensen O'Connor Johnson Kindness PLLC

(57) ABSTRACT

The present invention provides a multilayer stretch film comprising at least one core layer arranged between two exterior layers, wherein the thickness of the film is in the range of 5-40 μm, and wherein the film comprises a recycled post-consumer waste polyethylene material at a content of from 10 to 90% by weight based on the total weight of the film.

17 Claims, 3 Drawing Sheets

(51) Int. Cl.
   *B29C 48/08* (2019.01)
   *B29C 48/21* (2019.01)
   *B29K 105/26* (2006.01)

(52) U.S. Cl.
   CPC ...... *B29K 2023/06* (2013.01); *B29K 2105/26* (2013.01); *B32B 2250/242* (2013.01); *B32B 2250/40* (2013.01); *B32B 2272/00* (2013.01); *B32B 2307/54* (2013.01); *B32B 2307/732* (2013.01)

(56) References Cited

FOREIGN PATENT DOCUMENTS

| RU | 2343076 C2 | 1/2009 |
|---|---|---|
| WO | 9117886 A1 | 11/1991 |
| WO | 01/49487 A1 | 7/2001 |
| WO | 2008/011402 A1 | 1/2008 |
| WO | 2020/229932 A1 | 11/2020 |

OTHER PUBLICATIONS

S.M. Al-Salem, et al., "Study of the Degradation Profile for Virgin Linear Low-Density Polyethylene (LLDPE) and Polyolefin (PO) Plastic Waste Blends," Journal of Material Cycles and Waste Management 21(5):1106-1122, Sep. 2019 (published online May 2019).

International Preliminary Report on Patentability, mailed May 10, 2022, issued in corresponding International Application No. PCT/EP2020/081328, filed Nov. 6, 2020, 7 pages.

English translation of Russian Search Report issued in corresponding Russian Application No. 2022113469/05, filed Nov. 6, 2020, 2 pages.

\* cited by examiner

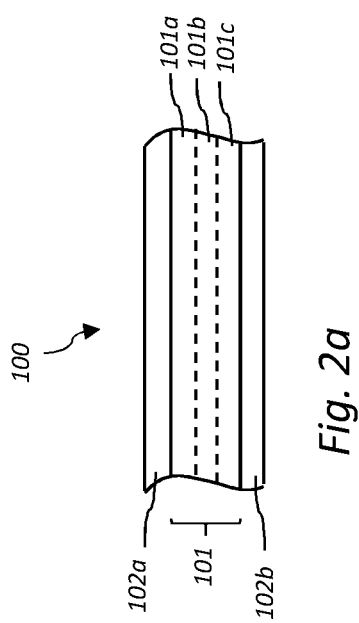
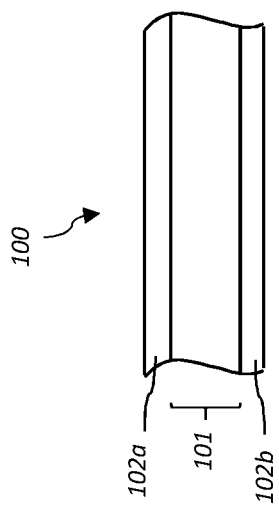

MULTILAYER STRETCH FILM

TECHNICAL FIELD

The present inventive concept relates to the field of stretch films, such as films used for stretch wrapping of objects.

BACKGROUND

Plastic stretch film is frequently used in different fields of application, in particular for wrapping various products, for example wrapping goods, e.g. on pallets, for shipping or storing, or for wrapping agricultural bulk products, such as grass, straw and various crops. The plastics industry is today increasingly striving to reduce its negative effects on environment and its contribution to global warming caused by consumption of fossil raw material and ultimately the carbon dioxide emission and "carbon footprint" of its products. One way to improve sustainability in this context is to reduce the overall consumption of raw fossil material by using alternative, renewable materials, improving recyclability of the products, or, in the case of plastic film, making thinner and lighter films requiring less raw material. It has also been proposed to use recycled plastic material as a starting material for making plastic products such as film.

Stretch films used for e.g. pallet wrapping or agricultural bale wrapping, are typically very thin, yet must have a high degree of stretchability, as well as certain mechanical characteristics, e.g. in terms of tear resistance and puncture resistance. Stretch films are often stretched more than 50% during use, and thus must have a sufficiently elongation capability in order to function properly. In agricultural applications where stretch film is used for silage production, anaerobic conditions are desirable, and so the film should also provide a barrier against moisture and oxygen. The requirements on the end product properties affect the choice of raw materials such as polyethylene.

Despite advancements made in recent years, there remains a need for stretch films having a lower environmental or climate impact.

SUMMARY OF THE INVENTION

It is an object of the invention to at least partly overcome one or more limitations of the prior art. In particular, it is an object to provide a stretch film comprising recycled post-consumer waste polyethylene material.

As a first aspect of the invention, there is provided a multilayer stretch film comprising at least one core layer arranged between two exterior layers, wherein the thickness of the film is in the range of 5-40 μm, and wherein the film comprises a recycled post-consumer waste polyethylene material at a content of from 10 to 90% by weight based on the total weight of the film.

In general, recycled plastic material may derive from industrial sources, called post-industrial recycled material (PIR), or from discarded consumer plastic products, (post-consumer recycled material, PCR). The composition and quality of PIR and PCR may differ greatly, PCR being of lower quality. PCR material usually comprises polymers from diverse sources, thereby giving the recycled polymeric material poor or unwanted predicted mechanical properties. As an example, recycled plastic material usually contains impurities, which have an effect on the mechanical properties of a produced film, and unmelted particles, which may easily cause problems during film manufacture, especially for blown stretch film manufacturing. Thus, PCR material has been regarded as unsuitable for incorporation into thin stretch films, such as stretch films having a thickness around or below 25 μm.

Now, however, it has surprisingly been found that a recycled post-consumer waste polyethylene material can be incorporated into a stretch film, and that the resulting stretch film has unexpectedly good tensile properties. A recycled post-consumer waste polyethylene content of 10-90% makes it possible to produce a blown stretch film without the film being ripped apart during manufacture. Thus, with the stretch film of the first aspect of the invention, the inventors have overcome preconceived ideas in the art that recycled post-consumer waste polyethylene cannot be introduced into stretch film with preserved or at least acceptable tensile and mechanical properties.

Recycled post-consumer waste polyethylene material, post-consumer recycled (PCR) waste polyethylene material and post-consumer recycled (PCR) polyethylene material are synonymous and these expressions are used herein to describe polyethylene material that has been previously incorporated into one or more consumer products, used by a consumer and then collected and processed in a recycling process by the original manufacturer or one or more other entities to produce a PCR material. PCR polyethylene material may thus be the recycled materials, such as blow moulded bottles, films, syringe cases, intravenous bags, tubing, and tubing fittings that have been recycled e.g. through community recycling programs. PCR polyethylene material also be comprised of e.g. recycled agricultural films, recycled stretch films, recycled shrink films or recycled stretch hoods. The PCR waste polyethylene material may thus originate from a resin of recycled polyethylene products.

The polymer composition of recycled post-consumer waste polyethylene material can vary depending e.g. on the source of the material. The recycled post-consumer waste polyethylene material may comprise a majority portion of polyethylene, such as LDPE. Fractions rich in shrink film are typically rich in LDPE with minor amounts of LLDPE and HDPE. Fractions rich in stretch wrap are typically rich in VLDPE and mLLDPE; and fractions rich in stretch hoods are typically rich in materials such as EVA and mLLDPE.

Recycled post-consumer waste polyethylene material typically comprises impurities. Thus, the recycled post-consumer waste polyethylene material may comprise impurities in an amount of at least 0.01%, by weight of the recycled post-consumer waste polyethylene material. Herein, the term "impurities" may refer to any material in the recycled post-consumer waste polyethylene material not being a polyethylene material. In an alternative definition, the term impurities may refer to any material in the recycled post-consumer waste polyethylene material having a density outside the range of 0.890-0.980 $g/cm^3$ such as outside the range of 0.890-0.940 $g/cm^3$.

Examples of impurities include cellulosic fibres, dirt/dust, decomposed organic matter such as humus, polyamide materials and ethyl vinyl alcohol materials, or other polymers having a density outside the range of 0.890-0.9800 $g/cm^3$.

The recycled post-consumer waste polyethylene material may comprise impurities in an amount of 0.01-2% by weight of the recycled post-consumer waste polyethylene material, such as in an amount of 0.01-1%, such as in the range of 0.01-0.9%, such as in the range of 0.01-0.8%, such as in the range of 0.01-0.7%, such as in the range of 0.01-0.6%, such as in the range of 0.01-0.5%, such as in the range of 0.01-0.4%, such as in the range of 0.01-0.3%, such as in the range of 0.01-0.2%, such as in the range of 0.01-0.1%, such as in the range of 0.1-1%, such as in the range of 0.2-1%, such as in the range of 0.3-1%, such as in the range of 0.4-1%, such as in the range of 0.5-1%, such as in the range of 0.6-1%. such as in the range of 0.7-1%, such as in the range of 0.8-1%, such as in the range of 0.9-1%.

A "stretch film" refers to film that is capable of deformation by stretching during use (e.g. wrapping an object). Hence, the stretch film is adapted to retain its qualities upon stretching, or at least retain an acceptable quality.

Furthermore, in some embodiments, the stretch film may be prestretched as part of its production process. Hence, the stretch film may be a prestretched stretch film, i.e. a prestretched film to be used as a stretch film, which implies that the pre-stretched film is further stretched during use. As used herein, "pre-stretched" or "prestretched" means that the polyethylene film is stretched, typically in the longitudinal direction (Machine direction) during the film production process before being wound onto rolls. Stretching is typically performed in a prestretch unit of the production line and involves passing the film between two or more stretching rollers rotating at different speeds. The prestretching may preferably be performed directly after the extrusion or film blowing steps, while the film is still hot. The degree of prestretching is intended to mean the difference in speed, in percent, between the stretching rollers in the prestretch unit. The difference in speed corresponds to the elongation of the prestretched film between the stretching rollers in the prestretch unit.

As an example, the pre-stretched film may have been stretched between two pairs of rollers during manufacture so that the film length increases by 50-400 percent, such as by 100-400%, such as by 100-300% such as by 100-200%, such as by 140-160%, such as by 150-400%, such as by 200-400%, such as by 200-300%, such as by 250-400%, such as by 300-400%.

A pre-stretched film may behave differently when subjected to further stretching compared to a non-prestretched film.

In embodiments of the first aspect, multi-layer stretch film is an agricultural stretch wrap film, or a bale wrap film, for example a silage film, such as a pre-stretched agricultural bale wrap film or silage film.

Typically, a silage film allows an anaerobic environment to be formed and thereby nutrients and energy content to be preserved during storage. A silage film should form a barrier for oxygen gas. Typically, a silage film has an oxygen permeability of less than 10 000 cm3/m2/24 h. Hence, according to an embodiment, the multilayer stretch film is a bale wrap film or silage film having an oxygen permeability of less than 10 000 cm3/m2/24 h, such as within the range of from 1000 to 10 000 cm3/m2/24 h measured according to the standard ASTM D-1434.

In embodiments of the first aspect, the multi-layer stretch film is configured to be used as pallet wrapping film to be operated by a pallet wrapping machine or by a hand-held device, i.e. a machine stretch film or as a manual stretch film.

In embodiments of the first aspect, the multi-layer stretch film is a waste wrap film.

In embodiments of the first aspect, the multi-layer stretch film is a pallet stretch wrap film.

The multilayer stretch film may be produced by conventional means, such as cast extrusion or blow extrusion. Thus, the multilayer stretch film may be either blown or cast. A blown stretch film has been melted and thereafter air-cooled when blown out. A cast stretch film has been cooled over cooling rollers.

The multilayer stretch film comprises at least one core layer arranged between two exterior layers. The exterior layers are thus skin layers of the film, i.e. the two outermost layers of the multi-layered film. The at least one core layer may be a single core layer or comprise at least two layers, such as at least three core layers. According to an embodiment, the multilayer stretch film is a coextruded multi-layer blown film comprising at least three layers: at least one core layer arranged between two exterior layers.

According to an embodiment, the multi-layer stretch film comprises from 2 to 5 core layers. However, the stretch film may comprise from 1 to up to 20 core layers. In embodiments, where the multi-layer stretch film comprises more than one core layer, wherein the core layers may have the same composition. Alternatively, the more than one core layers may differ in composition compared to each other.

In an embodiment, the film may consist of three layers; one core layer arranged between two exterior layers.

In another embodiment, the film may comprise at least five layers, such as three core layers arranged between two exterior layers.

In another embodiment, the film may comprise at least seven layers, such as five core layers arranged between two exterior layers.

One or more of the core layers may be a functional layer, such as a barrier layer. Optionally, a central core layer may be sandwiched by two tie layers ensuring compatibility and adhesion between the core layer and the skin layers.

In embodiments, the at least one core layer may form from 50% to 90%, such as from 70% to 80%, by weight of total weight of the stretch film. In a stretch film comprising one core layer, the one core layer may form from 50% to 90%, such as from 70% to 80% by weight of the total weight of the stretch film. In a stretch film comprising more than one core layer, the total number of core layers may form from 50% to 90%, such as from 70% to 80%, by weight of total weight of the stretch film.

The two exterior layers may together form from 10% to 50%, such as from 20% to 30% by weight of the total weight of the stretch film. Typically, the exterior layers each form about 10% by weight of total weight of the stretch film.

The two exterior layers may have the same or similar composition. Alternatively, the two exterior layers may differ in composition compared to each other. Typically, however an exterior layer comprises a thermoplastic polymer, such as a polyolefin, as a base material. Examples of suitable base materials for an exterior layer include polyethylene, especially LLDPE or VLDPE, and ethylene-vinyl acetate co-polymer.

The thickness values given throughout this specification refer to the thickness of the multilayer stretch film or a specific layer of the multilayer film stretch film after production. For a pre-stretched multilayer stretch film, the thickness refers to the thickness after the stretch film is stretched during its production.

The multilayer stretch film has a total film thickness within the range of from 5 to 40 µm. From an economic perspective, this film may be preferable as thin films means lower materials cost. The present multilayer stretch film may have a thickness of at most 25 µm, at most 22 µm or at most 20 µm. However, the thickness is typically at least at least 8 µm, at least 9 µm, at least 10 µm, at least 12 µm or at least 13 µm. Thus, for example, the thickness of the inventive film may be in the range of from 8 to 25 µm.

In an embodiment, the stretch film comprises a single core layer. The thickness of the one core layer may be within the range of from 5 to 28 µm, such as from 10 µm to 25 µm, for example from 10 µm to 20 µm. Alternatively, the stretch film may comprise more than one core layer. The thickness of the total number of core layers may be within the range of from 5 to 28 µm, such as from 5 µm to 25 µm, for example from 10 µm to 20 µm.

In embodiments of the first aspect, the thickness of the film is in the range of 5-25 µm, such as from 5-20 µm, such as from 7 to 17 µm.

As an example, the multilayer stretch film may be a pallet stretch wrap film having a thickness in the range of 5-25 µm, such as from 5-20 µm such as from 7 to 17 µm.

In embodiments of the first aspect, the thickness of the film is in the range of 10-40 µm, such as from 10 to 30 µm, preferably from 15 to 25 µm.

As an example, the multilayer stretch film may be an agricultural film, such as a silage film or a bale wrap, having a thickness in the range of 10-30 µm, such as from 10-35 µm, preferably from 15 to 25 µm.

In embodiments of the first aspect, comprises a recycled post-consumer waste polyethylene material at a content of from 10 to 50% by weight based on the total weight of the film.

In embodiments of the first aspect, the film comprises from 15 to 35% by weight of the recycled post-consumer waste polyethylene material.

As an example, the film may comprise between 20-30% by weight, such as about 25% by weight, of the recycled post-consumer waste polyethylene material.

In embodiments of the first aspect, the recycled post-consumer waste polyethylene material is comprised in the at least one core layer.

As an example, the recycled post-consumer waste polyethylene material may be comprised in the at least one core layer, whereas the exterior layers, i.e. the outer layers, are free of any recycled post-consumer waste polyethylene material.

In embodiments, at least one of the exterior layers is free of recycled post-consumer waste polyethylene material. Optionally, both exterior layers, or skin layers are free of PCR material. In this context, "free of" means that no PCR material is contained in said layer, by the fact that no PCR material is added to the melt extruded by the extruder in question during production of the film.

Consequently, in embodiments of the first aspect, both exterior layers are free of post-consumer waste polyethylene material.

Thus, all of the recycled post-consumer waste polyethylene material may be comprised within the at least one core layer of the film.

Polyethylene stretch films are commonly produced from linear low-density polyethylene (LLDPE). LLDPE is used in stretch films due to its favourable characteristics in respect of e.g. tensile strength, elongation at break and puncture resistance. The LLDPE used in stretch wrap polyethylene films, particularly films for agricultural applications, can be LLDPE prepared using a Ziegler Natta or Philips type catalyst and a comonomer, such as octene, to provide a suitable degree of short chain branching. This type of LLDPE typically has a density of about 0.918 g/cm$^3$. The LLDPE may also be prepared using a metallocene catalyst and a comonomer, such as octene.

In embodiments of the first aspect, the film comprises linear low-density polyethylene (LLDPE) at a content of from 30 to 80%, such as from 35 to 55%, such as from 40 to 45%, by weight based on the total weight of the film. The LLDPE may be virgin LLDPE, meaning LLDPE is poly- ethylene without recycled content. The virgin LDPE should be newly polymerised and not previously used in other applications.

In embodiments of the first aspect, the at least one core layer has weight content of LLDPE of at least 30%, such as at least 40%, such as at least 50%.

As an example, the linear low-density polyethylene (LLDPE) may be substantially free from long chain branching (LCB). Such an LLDPE may be produced using a Ziegler Natta catalyst and hexene, heptene or octene or a mixture thereof as comonomer. As an example, the comonomer may be octene. Thus, the linear low-density polyethylene (LLDPE) substantially free from long chain branching (LCB) may comprise from about 85% to about 98% by weight of recurring units of ethylene and from about 2% to about 15% by weight of recurring units of hexene, heptene or octene.

In embodiments of the first aspect the film comprises virgin low-density polyethylene (LDPE) having at a content of from 1 to 20%, such as from 2 to 15%, by weight of the total weight of the film.

Virgin low-density polyethylene (LDPE) may be polyethylene without recycled content. The virgin LDPE may also have been newly polymerised and not been used in other applications. LDPE may increase the bubble stability during manufacture of a blown film.

In embodiments, the multilayer film may comprise virgin low density polyethylene (LDPE) at a content of from 1 to 20%, such as from 2 to 15%, by weight of the total weight of the film. The LDPE may have a density of 0.915-0.935 g/cm$^3$ and/or a melt flow index (MFI) in the range of 0.15-4.5 g/10 min, the LDPE being present The MFI may be measured using ASTM D1238 and ISO 1133.

In embodiments, the PCR used in the multilayer film comprises a weight content of linear low-density polyethylene (LLDPE) of 35-100% and/or a weight content of linear low-density polyethylene LDPE of 0-65%.

In embodiments, the multilayer film may have a machine direction elongation at break of at least 200%, such as at least 250%, such as at least 270%, such as at least 300%, and up to 600%, such as up to 550%, such as up to 500%, or up to 450%, as determined according to ASTM D882.

When measuring the elongation percentage at break in accordance with the ASTM D882 standard, a strip of film with a width of 20 mm is clamped between two clamps at a distance of 50 mm from each other. The film stretched at a rate of 500 mm/min until the film breaks. At least five strips of the film must be measured, and the elongation capability corresponds to the mean value of the measurements.

In embodiments of the first aspect the stress required in order to stretch the film by 70% in the longitudinal direction is less than 17 MPa, preferably less than 14 MPa, as determined according to ASTM D882.

The stress required in order to stretch the prestretched film by 70 percent in the longitudinal direction can be read from the tensile strength graph obtained when measuring the elongation percentage at break in accordance with the ASTM D882 standard as described herein. At least five strips of the film must be measured, and the stress at 70 percent elongation corresponds to the mean value of the measurements.

According to an embodiment, the stretch film further comprises an agent being selected from an additional pigment and a UV stabilizer. An additional pigment may be advantageous for varying the colour and/or the opacity of the stretch film further. A UV stabilizer may be advantageous for preventing chain reactions caused by e.g. radicals within the polyolefin layer(s) of the film e.g. during storage outdoors of the film.

By the term "UV stabilization" is meant protection of a material from the long-term degradation effects from light, most frequently ultraviolet radiation (UV).

According to an embodiment, at least one exterior layer comprises a soft polymer. A soft polymer may provide a relatively soft surface to the at least one of the two exterior layers which may increase friction and reduce slip in a direction substantially parallel to the film surface. A soft polymer may be advantageous when the film is e.g. wrapped with an overlap, such that the film may adhere, or cling, to itself. By the term "cling" is meant the ability of a material to adhere to itself or an adjacent object. The adjacent object may be a layer of the same or a different film. As described herein, the stretch film according to the invention comprises at least two exterior layers and at least one core layer. Typically, at least one of the two exterior layers has a certain cling. In some embodiments, one exterior layer may have a higher degree of cling than an exterior layer arranged on the opposite side of the core layer.

According to an embodiment, the film may comprise a tackifier. Typically, at least one of the exterior layers may comprise a tackifier.

By the term "tackifier" is herein meant an agent that provides cling to a film. Such an agent may be added to a layer of the stretch film in order to increase the cling of the layer. For instance, a tackifier may be a soft polymer, or a migrating tackifier. A tackifier thus serves to increase the cling of the polyethylene film, in particular, of the exterior layers of a multilayer film.

According to an embodiment, the tackifier is a migrating tackifier. By the term "migrating tackifier" is herein meant a tackifier which is soluble in the film material, e.g. in polyethylene. If a migrating tackifier is added to a film (or film layer) in an amount exceeding the solubility level of the film (or film layer), the excess can migrate within the film material to the film surface (including also migrating from a first layer to and through another layer, when the first layer has been saturated with the migrating tackifier). A migrating tackifier may thus provide an adhesive surface which increases the friction in a direction substantially perpendicular to the film surface.

The at least one core layer may comprise migrating tackifier, e.g. in the form of polyisobutylene (PIB), at a content of from 0 to 15% by weight, e.g. from 1 to 15% by weight, such as from 3 to 7% by weight, based on the total weight of the at least one core layer. In an embodiment, the at least one core layer comprises approximately 5% by weight of PIB.

Additionally or alternatively, the cling of at least one of the exterior layers (skin layer) may be achieved by the use of a soft polymer, or a combination of soft polymers, in at least one of the two exterior layers.

Examples of suitable soft polymers include ethylene vinyl acetate co-polymer (EVA), ethyl methacrylate co-polymer (EMA) and very low-density polyethylene (VLDPE). Hence, in embodiments where an exterior layer comprises EVA, EMA, or VLDPE as a base material, this may provide sufficient cling, such that it may not be necessary to add a further tackifier. Optionally however, a layer comprising a soft polymer may also comprise a migrating tackifier.

VLDPE may be added to at least one exterior layer in order to provide cling to the at least one exterior layer. In an embodiment, the content of VLDPE may be up to 100% by weight of the at least one exterior layer. For instance, one of the two exterior layers may consist of 100% VLDPE.

The soft polymer EVA may be used in combination with the migrating tackifier PIB in order to provide cling to at least one exterior layer. For example, PIB may be added to the core layer at a content that is sufficient to allow migration to the exterior surface of at least one of the exterior layers upon saturation of the core layer and the at least one exterior surface. EVA may be comprised in the at least one exterior layer. An advantage of combining a soft polymer, e.g. EVA, and a migrating tackifier, e.g. PIB, in at least one exterior layer is that the cling may be improved due to increased resistance of the exterior layer to forces both substantially parallel as well as substantially perpendicular to the exterior surface of the exterior layer.

Suitable contents of at least one of a migrating tackifier, a soft polymer and a combination thereof, in the at least one core layer and/or in any or both of the two exterior layers of the stretch film are known to the person skilled in the art.

By the addition of an additional pigment to the at least one core layer, the colour and the opacity of the stretch film may be further varied. The at least one core layer may comprise an additional pigment in a range of from 0 to 10% by weight, e.g. from 1 to 10% by weight, based on the total weight of the at least one core layer. A stretch film for silage, typically comprises from 2 to 5% by weight of an additional pigment in the form of titanium dioxide ($TiO_2$).

Alternatively, an additional pigment may be absent in the stretch film. In such an embodiment, the stretch film can be relatively transparent.

In some applications, a certain level of opacity may be advantageous with regard to protection against noxious animals, such as vermin, birds, and insects, which may harm either the stretch film or the material being stored inside an arrangement of the stretch film, e.g. a bale of silage. As an example, a certain level of opacity of the stretch film may hinder a bird from observing the material of the bale of silage, thereby hinder the stretch film from being punctured by the beak or claws of the bird. The transparency of the stretch film is usually within the range of from 63 to 73%, such as approximately 70%, measured by the standard ASTM D-1003.

The stretch film according to embodiments of the invention may comprise a UV stabilizer, contained in at least one layer of the multi-layer film. Conventional UV stabilizer, known to the person skilled in the art, may be added for example to the at least one core layer. A UV stabilizer typically traps free radicals generated in the polyolefin material by UV irradiation, and may thus prevent chain reactions within the polyolefin layer(s) of the stretch film, which would otherwise result in degradation of the polyolefin material.

In embodiments of the invention, all layers of the stretch film may comprise a UV stabilizer. A good UV stabilization of the film material is desirable in order to avoid that the stretch film degrades during storage time outdoors which typically may be up to a year.

Examples of suitable UV stabilizers are Chimassorb 944 (BASF, Italy), Tinuvin 622 (BASF, Germany), and Chimassorb 2020 (BASF, Italy). An additional pigment, such as $TiO_2$ or CB, may also function as a UV stabilizer. The at least one core layer may comprise UV stabilizator in a range of from 0 to 0.6% by weight based on the total weight of the at least one core layer.

In some embodiments, the multilayer film comprises a recycled post-consumer waste polyethylene material at a content of from 10 to 50% by weight based on the total weight of the film, and a virgin polyethylene material at a content of 50 to 90% by weight based on the total weight of the film. The film may comprise a recycled post-consumer waste polyethylene material at a content of from 10 to 50%, such as of from 15-35, preferably of from 20-30%, by weight based on the total weight of the film.

As a second aspect of the invention, there is provided a method of producing a multilayer stretch film of the first aspect, the method comprising the steps of:
a) providing at least one first extrudible composition comprising at least one polymer;
b) providing at least one additional extrudible composition comprising at least one polymer;
c) extruding the at least one first extrudable composition obtained in step a) to form the least one core layer of the multilayer stretch film;
d) extruding the at least one additional extrudible composition to form two exterior layers on opposing sides of the at least one core layer.

This aspect may generally present the same or corresponding advantages as the former aspect. Effects and features of this second aspect are largely analogous to those described above in connection with the first aspect. Embodiments mentioned in relation to the first aspect are largely compatible with the second aspect.

The at least one first extrudible composition provided in step a) thus form the core layer of the multilayer stretch film, whereas the at least one additional extrudible composition provided in step b) forms the exterior layers.

In embodiments of the second aspect, step a) comprises providing at least two, such as at least there extrudible compositions.

In embodiments of the second aspect, all of the recycled post-consumer waste polyethylene material is provided in the at least one first extrudible composition of step a).

In embodiments of the second aspect, two additional extrudible compositions are provided in step b). Thus, step b) may comprise providing a second extrudable composition and a third extrudable composition.

For example, the second extrudible composition may be provided by mixing a soft polymer with optionally at least one additive selected form the group consisting of UV stabilizers and tackifiers. The second extrudible composition is typically adapted to provide cling. The third extrudible composition may be provided by mixing a polyolefin, e.g. a polyethylene, with optionally at least one additive selected form the group consisting of: UV stabilizers and tackifiers. The third extrudible composition may be adapted to provide a low friction surface.

Optionally, a single additional extrudible composition may be provided, which may be adapted to provide cling and/or a low friction surface.

The step of extruding the first composition obtained in step a) to form at least one core layer may imply that the first composition is extruded to a single core layer or to multiple core layers. Typically, in the case of multiple core layers, the multiple core layers are extruded simultaneously by coextrusion and adhere to each other due to substantially identical chemical properties.

The step of extruding the at least one additional extrudible composition to form two exterior layers on opposing sides of the core layer may imply extruding the second extrudible composition to form a first exterior layer on a first side of the core layer and extruding the third extrudible composition to form a second exterior layer on a second side of the core layer, wherein the first side of the core layer is arranged opposite to the second side of the core layer.

Alternatively, the single additional extrudible composition is extruded to form two exterior layers on opposing sides of the core layer.

The steps of extruding the first extrudible composition to form at least one core layer and the additional extrudible composition to form two exterior layers, respectively, may be performed separately from each other e.g. by monoextrusion, or simultaneously e.g. by coextrusion. Typically, the stretch film is prepared by co-extrusion, using one extruder per layer simultaneously. Monoextrusion and coextrusion are techniques generally known to the person skilled in the art.

In some embodiments of the second aspect, the method further comprises a step a0) providing gathered recycled post-consumer waste polyethylene material, and wherein the at least one polymer of at least one of steps a) and b) is said gathered recycled post-consumer waste polyethylene material provided in step a0). PCR material is typically gathered at the end user.

The step of a0) of providing gathered recycled post-consumer waste polyethylene material may comprise collecting used polyethylene material at a end user, and processing said used polyethylene material in a process to produce a post-consumer waste polyethylene material.

In some embodiments of the second aspect, the method further comprises the step:
(e) stretching the multilayer stretch film so that the film length increases by 50-400 percent. As discussed in relation to the first aspect of the inventions, it may be advantageous to provide a pre-stretched film. The stretching of step e) is preferably performed in a machine direction orientation (MDO) unit as a part of the extrusion process line.

In some embodiments of the second aspect, the (f) relaxing the film to obtain a manufactured, prestretched film. After relaxation in step f), or instead of step f), the film may be rolled onto a roll for space efficient storage.

In some embodiments of the second aspect, in step (f), the multilayer stretch film is stretched so that the film length increases by 100-400%, such as by 100-300% such as by 100-200%, such as by 140-160%, such as by 150-400%, such as by 200-400%, such as by 200-300%, such as by 250-400%, such as by 300-400%.

As discussed herein above, the multilayer stretch film may for example be used as an agricultural bale wrap film, a waste wrap film or a pallet stretch wrap film.

Consequently, as a third aspect of the invention there is provided the use of a multilayer stretch film according to the first aspect as an agricultural bale wrap film or net replacement film.

In embodiments, the use as a net replacement film comprises applying the film on a bale having an envelope surface and two side surfaces, and the film is applied on the envelope surface along its circumference, and such that the film covers at least said envelope surface. Preferably, the film of the first aspect is prestretched, having been stretched so that the film length increases by 100-300 percent, such as by 100-200%, such as by 140-160%

As a fourth aspect of the invention, there is provided the use of a multilayer stretch film according to the first aspect as a waste wrap film.

As a fifth aspect of the invention, there is provided the use of a multilayer stretch film according to the first aspect as pallet stretch wrap film.

As a sixth aspect of the invention, there is provided a method for wrapping compressed bulk material, comprising the steps of a) compressing bulk material in a chamber to form a bale of compressed bulk material;

b) further stretching a multilayer stretch film according to the first aspect to a stretch ratio of from 1:1.02 to 1:2.5 relative to the length of the prestretched film;

c) applying said film under tension around said bale, in direct contact with the compressed bulk material; and d) wrapping said film under tension at least 1.5 turns around said bale, preferably such that substantially no expansion of the bale of compressed bulk material occurs when the bale is removed from the chamber.

The, the sixth aspect provides a method for wrapping compressed bulk material with a film as defined in the first aspect of the present invention. Conventional baling of agricultural bulk products, such as grass, hay, silage or straw comprises compressing the product in the baling chamber of a baling apparatus to form a round bale and subsequently wrapping a net or a film around the bale in order to retain the compressed shape, or at least to allow only little expansion, when the bale leaves the baling chamber.

As used herein, the term "bulk material" refers agricultural bulk products such as grass, hay, silage or straw. The inventors have surprisingly found that the mechanical properties of the inventive film of the first aspect are sufficient for the film to be used for the of wrapping compressed bulk material, despite that the inventive film comprises recycled post-consumer waste polyethylene material.

In some embodiments of the sixth aspect, the further stretching is performed to a stretch ratio of from 1:1.10 to 1:1.35, such as of from 1:1.10 to 1:1.30, such as of from 1:1.20 to 1:1.30, such as of from 1:1.10 to 1:25, such as of from 1:1.13 to 1:1.23.

In some embodiments of the sixth aspect, the compressed bulk material is a round bale having an envelope surface and two side surfaces, and the film in step (b) is applied on the envelope surface along its circumference, such that the film covers at least the envelope surface. The film may be applied on the envelope surface of the bale along its circumference and optionally such that the film extends over an edge of said envelope surface to cover part of at least one of the side surfaces of the bale. In this way, the side surfaces of the round bale are enforced near the edges of the bale, providing improved mechanical protection as well as an improved barrier to moisture and oxygen.

In some embodiments of the sixth aspect, a single layer of the film covers the entire width of the envelope surface.

The film of the sixth aspect may be referred to as a "net replacement film", as it is intended to replace the nets that have been used to wrap the envelope surface of bales in prior art solutions.

In some embodiments of the sixth aspect, 2-10 layers of said prestretched film are applied around the bale of compressed bulk material, as measured centrally on an envelope surface of the bale of compressed bulk material. The present inventors have found that the application of 2-10 layers may desirably balance the requirements for quality, yield and efficiency in the baling/wrapping process

BRIEF DESCRIPTION OF THE DRAWINGS

FIGS. 2a and 2b are schematic illustrations of the different layers in multilayer stretch films according to embodiments of the present disclosure.

DETAILED DESCRIPTION

Figure 1A:
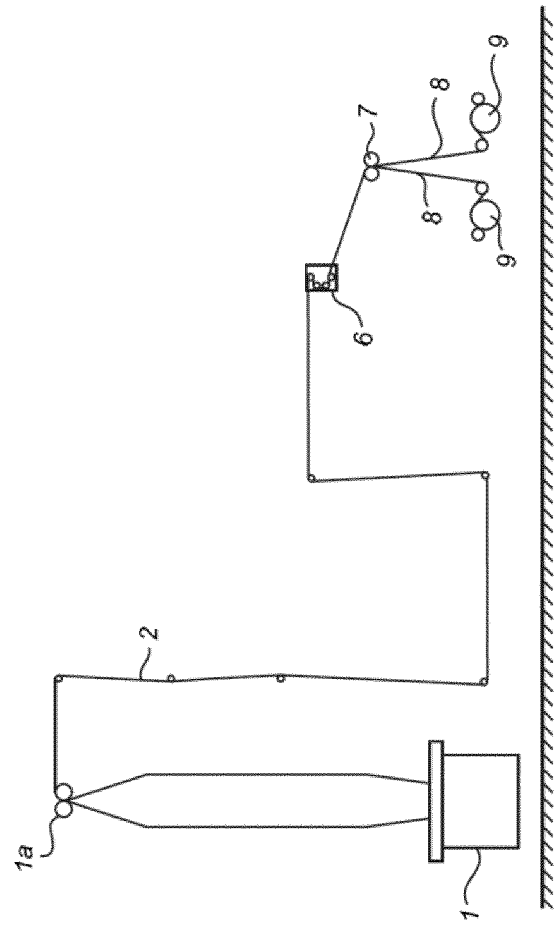
FIGS. 1a and 1b are schematic illustrations of the process and equipment for producing multilayer stretch films according to embodiments of the present disclosure.
Figure 1B:
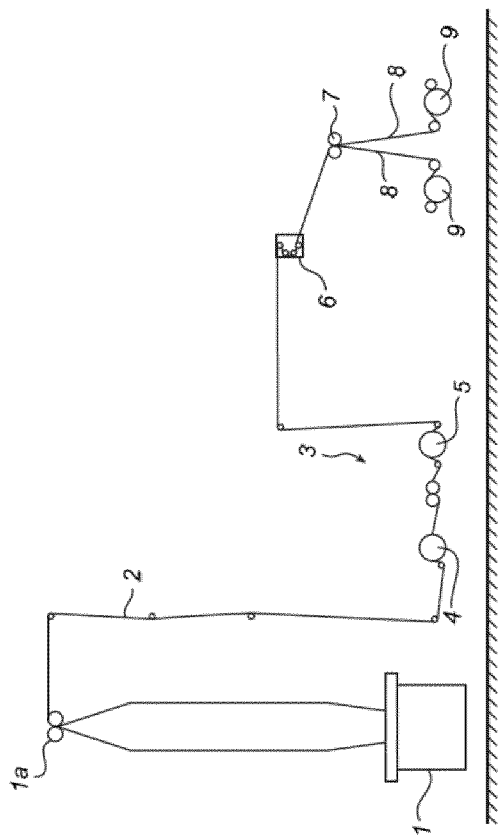

FIG. 1a illustrates an exemplary method of producing the multilayer stretch film according to the invention, in which the film is not pre-stretched in-line during manufacture.

A film composition comprising at least 10% by weight of recycled post-consumer waste polyethylene material (PCR) is extruded from a blow extruder 1 to form a blown film bubble that is advanced through primary nip rollers 1a. The nip roller nips together the blown film and the tubular film is passed to a dividing station 6 where the edges of the film 2 may be cut to provide two individual sheets of film. Next, the film 2 is passed to the secondary nip rollers 7 where the individual sheets of film 8 may be separated. Each film sheet 8 may optionally pass through a second dividing station (not shown) where the sheet may be divided longitudinally into two or more parallel sections. Finally, the film sheets, or film sheet sections, are wound onto the winders 9. In embodiments of the invention where the edges of the tubular film are not cut in the dividing station 6, the tubular film is typically wound onto one of the winders 9.

FIG. 1a illustrates an exemplary method of producing the multilayer stretch film according to the invention, in which the film is pre-stretched in-line during manufacture.

A film composition comprising at least 10% by weight of recycled post-consumer waste polyethylene material (PCR) is extruded from a blow extruder 1 to form a blown film bubble that is advanced through primary nip rollers 1a. The nip roller nips together the blown film.

Optionally, for producing a prestretched film, the tubular film 2 is passed from the primary nip rollers via guide rollers to the stretch unit 3, where stretching is performed between two rollers, first draw roller 4 and second draw roller 5, having different speeds. After being stretched in the stretch unit 3, the tubular film is passed to a dividing station 6 where the edges of the film 2 may be cut to provide two individual sheets of film. Next, the film 2 is passed to the secondary nip rollers 7 where the individual sheets of film 8 may be separated. Each film sheet 8 may optionally pass through a second dividing station (not shown) where the sheet may be divided longitudinally into two or more parallel sections. Finally, the film sheets, or film sheet sections, are wound onto the winders 9. In embodiments of the invention where the edges of the tubular film are not cut in the dividing station 6, the tubular film is typically wound onto one of the winders 9.

In order to achieve a desired prestretching, the film may be stretched in the stretch unit 3 and subsequently relaxed. For example, the precursor film may be stretched by more than the desired final degree of prestretching and partially relaxed. For instance, the film may be stretched in the stretch unit by 180% and then relaxed to provide a prestretched film having a prestretching degree of 150%. Hence, as used herein, the expression "degree of prestretching" refers to the degree of prestretching of the manufactured film, which is optionally relaxed, and not necessarily to the maximum degree of stretching experienced by the film during the manufacturing process. The stretching is typically conducted at a temperature in the range of 20° C. to 70° C.

FIG. 2a shows an illustrative example of a multilayer stretch film 100 of the present disclosure suitable for use as a pallet wrapping film.

The film 100 comprises at least one core layer 101 arranged between two exterior layers 102a, 102b. The film 100 comprises a recycled post-consumer waste polyethylene material at a content of from 10 to 50% by weight based on the total weight of the film 100.

In this illustrative example, the core layer 101 comprises three individual core layers 101a, 101b and 101c.

The core layers 101a, 101b and 101c have together about 80% of the weight content of the film 100, whereas the exterior layers 102a, 102b have about 10% of the weight content each. As an example, the middle core layer may have about 40% of the total weight content of the film 100, whereas the upper 101a and lower 101b core layer have about 20% of the total weight content of the film 100.

In this example, all of the recycled post-consumer waste polyethylene material is within the core layers. All of the individual core layers may have the same weight percentage of the post-consumer waste polyethylene material.

The total thickness of the film 100 illustrated in FIG. 2a, i.e. the thickness of the core layer 101 and the two exterior layers 102a, 102b, is in the range of 5-30 μm, such as between 10-25 μm.

FIG. 2b shows an illustrative example of a multilayer stretch film 100 of the present disclosure suitable for use as a bale wrap film.

The film 100 comprises a single core layer 101 arranged between two exterior layers 102a, 102b. The film 100 comprises a recycled post-consumer waste polyethylene material at a content of from 10 to 50% by weight based on the total weight of the film 100.

The core layer 101 comprises between 70-80% of the total weight content of the film 100, whereas the exterior layers 102a, 102b have about 10-15% each of the total weight content.

In this example, all of the recycled post-consumer waste polyethylene material is within the single core layer 101.

The total thickness of the film 100 illustrated in FIG. 2b, i.e. the thickness of the core layer 101 and the two exterior layers 102a, 102b is in the range of 20-30 μm, such as about 25 μm.

Figure 3:
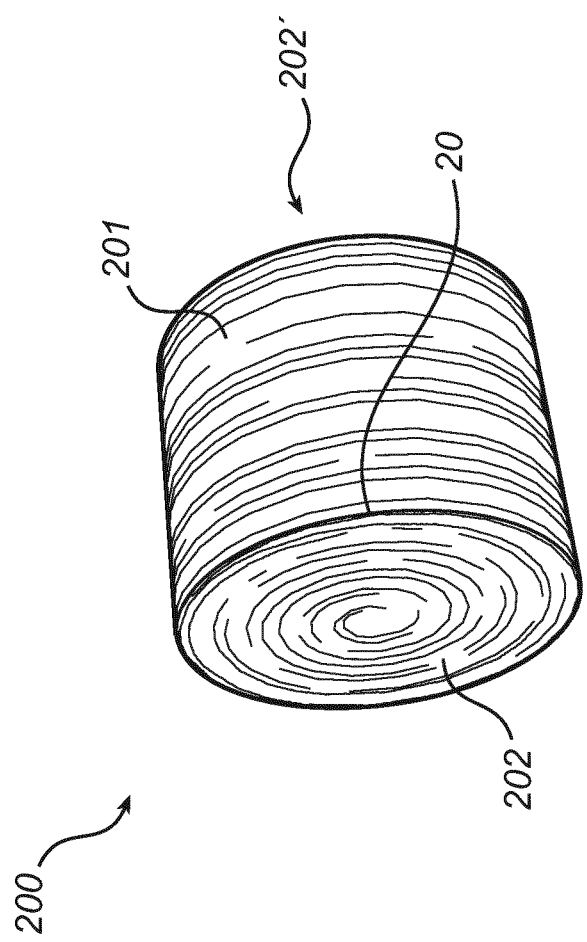
FIG. 3 is a perspective view of a round bale illustrating the shape and features referred to in the description of the present invention

FIG. 3 illustrates a typical agricultural round bale, e.g. for silage production. The bale 200, having been compressed in the baling chamber of the baler (not shown), has a generally cylindrical shape comprising an envelope surface 201 and two side surfaces 202.

Conventional baling of agricultural bulk products, such as grass, hay, silage or straw comprises compressing the product in the baling chamber of a baling apparatus to form a round bale and subsequently wrapping a net around the bale in order to retain the compressed shape, or at least to allow only little expansion, when the bale leaves the baling chamber. The film of the present invention may be used to replace said net, hence the term "net replacement film", When used in a baling process, the prestretched film according to the invention is typically provided in the form of a film roll mounted in the baler used for the baling, and is dispensed from the roll via film dispensing means to a second stretch unit also provided in the baler. In the second stretch unit the film is subjected to a second stretching, effected in one or more stretching steps. In the second stretch unit the prestretched film may be stretched longitudinally by 2-150% relative to its prestretched length, corresponding to a stretch ratio of from 1:1.02 to 1:2.5, such as of from 1:1.10 to 1:1.35, such as of from 1:1.10 to 1:1.30, such as of from 1:1.20 to 1:1.30, such as of from 1:1.10 to 1:25, such as of from 1:1.13 to 1:1.23. After the second stretching, the film is applied under tension on the bale, still within the baling chamber. Balers provided with means for holding a film roll, film dispensing means and a stretch unit are known in the art and may be employed in a method according to the present invention.

The baling method described herein may reduce the volume of the bale of compressed material by up to 17% compared to the volume of a bale wrapped with conventional net. It is even possible that the net replacement film may achieve a further compression of the bale compared to its dimensions before wrapping; however, such a compression is difficult to determine since the exact actual dimensions of the compressed bale in the baling chamber are unknown and hence the inner dimensions of the chamber are used for calculating a theoretical bale volume.

The film may be applied at least about 1.5 turns around the bale, i.e. such that at least about half of the envelope surface of the bale is covered by two layers of the film and the remaining part of the envelope surface of the bale is covered by a single layer of the film. By applying the film with at least half a turn of overlap between film layers, a film comprising a tackifying agent as described above adheres sufficiently firmly to itself in order to exert the force(s) necessary on the bale. The present film may also be applied more than 1.5 turns around the bale, for example, the film may be applied to provide from 2 to 10 layers of film as measured centrally on the envelope surface of the bale. Typically, from 3 to 5 layers of film are applied around the bale.

If the film does not contain a tackifying agent, the film must be attached by other means when applied on the bale. Examples of such means include tape strips and adhesive, which can be applied on the film, e.g. in the area of overlapping layers, in order for the subsequent film layer to adhere to the preceding film layer The present film is typically applied on the bale as a first contact layer, that is, the first layer of film is applied directly onto the bulk material. Typically, no netting is applied around the bale before applying the present film. Hence, the present film can be used for replacing the net, thus avoiding many drawbacks of conventional baling methods, while also offering the new advantage of reducing the volume of the bale.

When the desired number of layers of film have been applied, the film is cut and, if necessary, attached to the subsequent layer and then the wrapped bale is ejected from the baling chamber.

EXPERIMENTAL EXAMPLES

Example 1: Manufacture of a Blown Pallet Stretch Film of Different Thickness

Materials and Methods

Multilayer stretch films were produced having a PCR content of about 25% by weight. The multilayer films were produced without any pre-stretching during manufacture. The films were five-layer films consisting of two extruded outer layers (skin layers) A and E and three extruded core layers B-D, which were blown to different thicknesses. The compositions of the different layers of the multifilm are listed in Table 1 below.

TABLE 1

| Layer | Layer type | Weight (% of whole multilayer film) | Composition |
|---|---|---|---|
| A | skin | 10 | Plastomer[1] 98%, AO[2] 2%. |
| B | core | 20 | LLDPE[3] 58%, PCR[4] 32%, Edge portions[5] 10% |
| C | core | 40 | LLDPE 50%, PCR 32%, Edge portions 18% |
| D | core | 20 | LLDPE 58%, PCR 32%, Edge portions 10% |
| E | skin | 10 | LDPE[6] 100% |

[1]= MFI 3 g/10 min (2.16 kg, 190° C.), density 0.880 g/cm$^3$
[2]= Antioxidant
[3]= MFI 1.0 g/10 min (2.16 kg, 190° C.), density 0.920 g/cm$^3$
[4]= PCR (LLDPE content 35-100%, LDPE content 0-65%)
[5]= Recycled edge trims of the same produced film
[6]= MFI 0.75 g/10 min (2.16 kg, 190° C.), density 0.923 g/cm$^3$ The multi-layered film was produced in three different target thicknesses: 12 μm, 17 μm and 23 μm. Physical parameters of the produced films were measured using standard methods as known in the art.

Results

The measured physical properties of the produced films (films 1-3) are listed in Table 2 below.

TABLE 2

| Property | Method | Film 1 | Film 2 | Film 3 |
|---|---|---|---|---|
| Film thickness (μm) | SS241013B | 13.3 | 18.5 | 26.6 |
| Dartdrop (g) | ASTMD1709 | 65 | 90 | 130 |
| Elmendorf MD (mN) | ASTMD1922 (ISO 6383) | 291 | 660 | 1196 |
| Elmendorf TD (mN) | ASTMD1922 (ISO 6383) | 4161 | 5567 | 8138 |
| Tear strength MD (MPa) | ASTM 882D (ISO 527-3) | 34.3 | 28.8 | 23.4 |
| Tear strength TD (MPa) | ASTM 882D (ISO 527-3) | 18.6 | 19.5 | 18.1 |
| Yield point (MPa) | ASTM 882D (ISO 527-3) | 13.0 | 10.4 | 8.8 |
| Yield point (MPa) | ASTM 882D (ISO 527-3) | 10.0 | 10.3 | 10.2 |
| Elongation MD (%) | ASTM 882D (ISO 527-3) | 270 | 351 | 414 |
| Elongation TD (%) | ASTM 882D (ISO 527-3) | 593 | 588 | 589 |

As seen in Table 2, all films had good tensile strength properties. In addition, the stretching properties were tested in a wrapping machine (Cyklop GL300), in which it was concluded that film 1 could be stretched about 160% and film 3 could be stretched about 350%.

Example 2: Manufacture of a Bale Wrap Film (Silage Film)

Materials and Methods

A wrap film produced having a PCR content of about 25% by weight. The wrap film was a three-layer film consisting of two extruded outer layers (skin layers) A and C and an extruded core layer B. Two different films were produced; one with a PCR weight content of about 25% PCR and one with a PCR weight content of about 35%.

The composition of the different layers of the wrap film are listed in Tables 3 and 4 below

TABLE 3

| Layer | Layer type | Weight (% of whole multilayer film) | Composition of film 5 |
|---|---|---|---|
| A | skin | 10 | EVA[1] 94%, UV Stabilizers and tackifier 6% |
| B | core | 77 | LLDPE[2] 43.8%, PCR[3] 32%, PIR[4] 10%, Color masterbatch, UV stabilizers and tackifier 14.2% |
| C | skin | 13 | LLDPE[5] 83.2%, LDPE[6] and UV stabilizer 16.8% |

[1]= Vinyl acetate content: 18% by weight, MFI 1.7 g/10 min (2.16 kg, 190° C.), density 0.941 g/cm$^3$
[2]= MFI 0.85 g/10 min (2.16 kg at 190° C.), density 0.918 g/cm$^3$
[3]= PCR (LLDPE content 35-100%, LDPE content 0-65%)
[4]= PIR (Post industrial recycled polymeric material), such as recycled edge trims of the same produced film or similar films
[5]= MFI 1.0 g/10 min (2.16 kg at 190° C.), Density 0.920 g/cm$^3$
[6]= MFI 0.25 g/10 min (2.16 kg at 190° C.), Density 0.921 g/cm$^3$

TABLE 4

| Layer | Layer type | Weight (% of whole multilayer film) | Composition of film 4 |
|---|---|---|---|
| A | skin | 10 | EVA[1] 94%, UV Stabilizers and tackifier 6% |
| B | core | 77 | LLDPE[2] 30.8%, PCR[3] 45%, PIR[4] 10%, Color masterbatch, UV stabilizers and tackifier 14.2% |
| C | skin | 13 | LLDPE[5] 83.2%, LDPE[6] and UV stabilizer 16.8% |

[1]= Vinyl acetate content: 18% by weight, MFI 1.7 g/10 min (2.16 kg, 190° C.), density 0.941 g/cm$^3$
[2]= MFI 0.85 g/10 min (2.16 kg at 190° C.), density 0.918 g/cm$^3$
[3]= PCR (LLDPE content 35-100%, LDPE content 0-65%)
[4]= PIR (Post industrial recycled polymeric material), such as recycled edge trims of the same produced film or similar films
[5]= MFI 1.0 g/10 min (2.16 kg at 190° C.), Density 0.920 g/cm$^3$
[6]= MFI 0.25 g/10 min (2.16 kg at 190° C.), Density 0.921 g/cm$^3$ Physical parameters of the produced films were measured using standard methods as known in the art.

Results

The measured physical properties of the produced films (films 4 and 5) are listed in Table 5:

TABLE 5

| Property | Method | Film 4 | Film 5 |
|---|---|---|---|
| Film thickness (μm) | SS241013B | 24.2 | 24.3 |
| Dartdrop (g) | ASTMD1709 | 160 | 190 |
| Elmendorf MD (mN) | ASTMD1922 (ISO 6383) | 1004 | 1170 |
| Elmendorf TD (mN) | ASTMD1922 (ISO 6383) | 6389 | 7312 |
| Tear strength MD (MPa) | ASTM 882D (ISO 527-3) | 23.7 | 25.8 |
| Tear strength TD (MPa) | ASTM 882D (ISO 527-3) | 18.7 | 18.5 |
| Yield point (MPa) | ASTM 882D (ISO 527-3) | 8.1 | 8.4 |
| Yield point (MPa) | ASTM 882D (ISO 527-3) | 8.8 | 8.5 |
| Elongation MD (%) | ASTM 882D (ISO 527-3) | 426 | 444 |
| Elongation TD (%) | ASTM 882D (ISO 527-3) | 618 | 614 |

As seen in Table 5, both films had good tensile strength properties. In addition, the wrap films were tested in a baling machine to confirm that the films had sufficiently good wrapping properties.

Example 3. Manufacture of a Net Replacement Film

Materials and Methods

Net replacement film having PCR content of 25% was produced. The net replacement films were three-layer films each consisting of two extruded outer layers (skin layers) A and C and an extruded core layer B. Two different films (NRF A and NRF B) were produced; with a PCR weight content of about 25% PCR. The films were pre-stretched to a degree of 175% (NRF A) and 220% (NRF B).

The composition of the different layers of the net replacement film are listed in Tables 6 and 7 below

TABLE 6

NRF A

| Layer | Layer type | Weight (% of whole multilayer film) | Composition of film 5 |
|---|---|---|---|
| A | skin | 10 | EVA[1] 96%, UV Stabilizers and tackifier 4% |
| B | core | 77 | LLDPE[2] 57%, PCR[3] 32%, PIR[4] 6.5%, Color masterbatch, UV stabilizers and tackifier 4.5% |
| C | skin | 13 | LLDPE[5] 87%, LDPE[6] and UV stabilizer 13% |

[1]= Vinyl acetate content: 18% by weight, MFI 1.7 g/10 min (2.16 kg, 190° C.), density 0.941 g/cm$^3$
[2]= MFI 0.85 g/10 min (2.16 kg at 190° C.), density 0.918 g/cm$^3$
[3]= PCR (LLDPE content 35-100%, LDPE content 0-65%)
[4]= PIR (Post industrial recycled polymeric material), such as recycled edge trims of the same produced film or similar films
[5]= MFI 1.0 g/10 min (2.16 kg at 190° C.), Density 0.920 g/cm$^3$
[6]= MFI 0.25 g/10 min (2.16 kg at 190° C.), Density 0.921 g/cm$^3$

TABLE 7

NRF B

| Layer | Layer type | Weight (% of whole multilayer film) | Composition of film 4 |
|---|---|---|---|
| A | skin | 10 | EVA[1] 96%, UV Stabilizers and tackifier 4% |
| B | core | 77 | LLDPE[2] 57%, PCR[3] 32%, PIR[4] 6.5%, Color masterbatch, UV stabilizers and tackifier 4.5% |
| C | skin | 13 | LLDPE[5] 87%, LDPE[6] and UV stabilizer 13% |

[1]= Vinyl acetate content: 18% by weight, MFI 1.7 g/10 min (2.16 kg, 190° C.), density 0.941 g/cm$^3$
[2]= MFI 0.85 g/10 min (2.16 kg at 190° C.), density 0.918 g/cm$^3$
[3]= PCR (LLDPE content 35-100%, LDPE content 0-65%)
[4]= PIR (Post industrial recycled polymeric material), such as recycled edge trims of the same produced film or similar films
[5]= MFI 1.0 g/10 min (2.16 kg at 190° C.), Density 0.920 g/cm$^3$
[6]= MFI 0.25 g/10 min (2.16 kg at 190° C.), Density 0.921 g/cm$^3$ Physical parameters of the produced films were measured using standard methods as known in the art, and compared to a reference film made from virgin material.

The produced films were also tested as net replacement for wrapping the envelope surface of a silage bale.

Results

The produced film NRF A could satisfactorily be used to wrap the envelope surface of approximately 1100 silage bales in a McHale Fusion 3 Plus integrated baler wrapper, with a stretching before wrapping in the range of 18-27%, under a temperature of up to 26° C. When wrapped on a silage bale, no differences could be observed between the NRF A film and a reference film made from virgin material. The test was performed during June and September The produced film NRF B could satisfactorily be used to wrap the envelope surface of approximately 1000 silage bales in a McHale Fusion 3 Plus integrated baler wrapper, with a stretching before wrapping in the range of 15-20%, under a temperature of up to 28° C. When wrapped on a silage bale, no differences with regard to the mechanical properties could be observed between the NRF B film and a reference film made from virgin material. The test was performed during June and September The measured physical properties of the produced films (NRF A and NRF B) and a reference film (Ref) made of virgin material are listed in Table 8:

TABLE 8

| Property | Method | NRF A | NRF B | Ref |
|---|---|---|---|---|
| Film thickness (μm) | SS241013B | 16.2 | 15.3 | 15.8 |
| Dartdrop (g) | ASTMD1709 | 125 | 120 | 120 |

TABLE 8-continued

| Property | Method | NRF A | NRF B | Ref |
|---|---|---|---|---|
| Elmendorf MD (mN) | ASTMD1922 (ISO 6383) | 1066 | 1002 | 1113 |
| Elmendorf TD (mN) | ASTMD1922 (ISO 6383) | 5260 | 5288 | 5093 |
| Tear strength MD (MPa) | ASTM 882D (ISO 527-3) | 77.1 | 102.0 | 76.2 |
| Tear strength TD (MPa) | ASTM 882D (ISO 527-3) | 16.1 | 15.5 | 23.2 |
| Yield point MD (MPa) | ASTM 882D (ISO 527-3) | 36 | 48.5 | 37.0 |
| Yield point TD (MPa) | ASTM 882D (ISO 527-3) | 10.9 | 11.7 | 11.6 |
| Elongation MD (%) | ASTM 882D (ISO 527-3) | 169 | 140 | 169 |
| Elongation TD (%) | ASTM 882D (ISO 527-3) | 582 | 581 | 689 |

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Itemized List of Embodiments

1. A multilayer stretch film comprising at least one core layer arranged between two exterior layers, wherein the thickness of the film is in the range of 5-40 μm, and wherein the film comprises a recycled post-consumer waste polyethylene material at a content of from 10 to 90% by weight based on the total weight of the film.

2. The film according to item 1, wherein at least one of the exterior layers is free of recycled post-consumer waste polyethylene material.

3. The film according to item 2, wherein both exterior layers are free of recycled post-consumer waste polyethylene material.

4. The film according to any previous item, wherein the film comprises a recycled post-consumer waste polyethylene material at a content of from 10 to 50% by weight based on the total weight of the film.

5. The film according to item any previous item, wherein the thickness of the film is in the range of 5-20 μm, such as from 5 to 25 μm, such as from 7 to 17 μm.

6. The film according to any one of items 1-4, wherein the thickness of the film is in the range of 10-40 μm, preferably from 15 to 40 μm, such as from 15 to 25 μm.

7. The multilayer film according to any one of the preceding items, wherein the film comprises from 15 to 35% by weight of the recycled post-consumer waste polyethylene material.

8. The multilayer film according to any one of the preceding items, wherein said recycled post-consumer waste polyethylene material is comprised in the at least one core layer.

9. The multilayer film according to any one of the preceding items, wherein the film comprises virgin linear low density polyethylene (LLDPE) at a content of from 30 to 80%, such as from 35 to 55%, such as from 40 to 45%, by weight based on the total weight of the film.

10. The multilayer film according to any one of the preceding items, wherein the film comprises virgin low density polyethylene (LDPE) at a content of from 1 to 20%, such as from 2 to 15%, by weight of the total weight of the film.

11. The multilayer film according to any one of the preceding items, wherein the film has a machine direction elongation at break of at least 200%, such as at least 250%, such as at least 270%, such as at least 300%, as determined according to ASTM D882.

12. The multilayer film according to any one of the preceding items, wherein the stress required in order to stretch the film by 70% in the longitudinal direction is less than 17 MPa, preferably less than 14 MPa, as determined according to ASTM D882.

13. Use of a multilayer stretch film according to any one of items 1 to 12 as an agricultural bale wrap film.

14. Use of a multilayer stretch film according to any one of items 1 to 12 as a waste wrap film.

15. Use of a multilayer stretch film according to any one of the items 1 to 12 as pallet stretch wrap film.

What is claimed is:

1. A multilayer stretch film comprising at least one core layer arranged between two exterior layers, wherein the thickness of the film is in the range of 5-40 μm, and wherein the film comprises virgin material and recycled post-consumer waste polyethylene material at a content of from 10 to 90% by weight based on the total weight of the film, wherein the recycled post-consumer waste polyethylene material is derived from polyethylene material that has previously been incorporated into one or more end products, the end products have been used by consumer end users, and then collected and processed in a recycling process to form the recycled post-consumer waste polyethylene material used in the multilayer stretch film, and wherein the film has a machine direction elongation at break of up to 500% as determined according to ASTM D882. .

2. The multilayer stretch film according to claim 1, wherein at least one of the exterior layers is free of recycled post-consumer waste polyethylene material.

3. The multilayer stretch film according to claim 1, wherein both exterior layers are free of recycled post-consumer waste polyethylene material.

4. The multilayer stretch film according to claim 1, wherein the film comprises the recycled post-consumer waste polyethylene material at a content of from 10 to 50% by weight based on the total weight of the film.

5. The multilayer stretch film according to claim 4, wherein the film comprises the recycled post-consumer waste polyethylene material at a content of from 15 to 35% by total weight of the film.

6. The multilayer stretch film according to claim 1, wherein the thickness of the film is in the range of from 5 to 20 μm.

7. The multilayer stretch film according to claim 6, wherein the thickness of the film is in the range of from 7 to 17 μm.

8. The multilayer stretch film according to claim 1, wherein the thickness of the film is in the range of from 10 to 40 μm.

9. The multilayer stretch film according to claim 8, wherein the thickness of the film is in the range of from 15 to 25 μm.

10. The multilayer stretch film according to claim 1, wherein said recycled post-consumer waste polyethylene material is comprised in the at least one core layer.

11. The multilayer stretch film according to claim 1, wherein the film comprises virgin linear low density polyethylene (LLDPE) at a content of from 30 to 80% by weight based on the total weight of the film.

12. The multilayer stretch film according to claim 11, wherein the film comprises virgin linear low density polyethylene (LLDPE) at a content of from 35 to 55% by weight based on the total weight of the film.

13. The multilayer stretch film according to claim 1, wherein the film comprises virgin low density polyethylene (LDPE) at a content of from 1 to 20% by weight of the total weight of the film.

14. The multilayer stretch film according to claim 1, wherein the stress required in order to stretch the film by 70% in the longitudinal direction is less than 17 MPa as determined according to ASTM D882.

15. The multilayer stretch film according to claim 4, wherein the multilayer film comprises the recycled post-consumer waste polyethylene material at a content of from 10 to 50% by weight based on the total weight of the film, and a virgin polyethylene material at a content of 50 to 90% by weight based on the total weight of the film.

16. The multilayer stretch film according to claim 1, wherein the multilayer stretch film is a pre-stretched film.

17. The multilayer stretch film according to claim 1, wherein the multilayer stretch film is a non-pre-stretched film.

\* \* \* \* \*